United States Patent [19]

Abolins et al.

[11] Patent Number: 4,910,241

[45] Date of Patent: Mar. 20, 1990

[54] CROSSLINKABLE FLAME RETARDANT COMPOSITIONS OF OLEFINIC RUBBER AND POLYPHENYLENE ETHER

[75] Inventors: Visvaldis Abolins, Delmar, N.Y.; Joseph E. Betts, Westport, Conn.; Fred F. Holub, Schenectady, N.Y.; Gim F. Lee, Jr., Albany, N.Y.

[73] Assignee: General Electric Company, Selkirk, N.Y.

[21] Appl. No.: 525,784

[22] Filed: Aug. 25, 1983

[51] Int. Cl.$^4$ ............................ C08K 5/52; C08K 5/51; C08L 53/00
[52] U.S. Cl. .................................. 524/141; 524/142; 524/143; 524/374; 524/409; 524/508; 525/92; 525/132; 525/152; 525/192; 525/332.5; 525/387
[58] Field of Search ............... 260/DIG. 24; 524/141, 524/142, 143, 374, 409, 508; 525/92, 132, 152, 192, 332.5, 387

[56] References Cited

U.S. PATENT DOCUMENTS

| | | | |
|---|---|---|---|
| 3,632,680 | 1/1972 | Hunt | 525/387 |
| 3,639,506 | 2/1972 | Haaf | 524/141 |
| 4,134,927 | 1/1979 | Tomoshige et al. | 525/245 |
| 4,166,055 | 8/1979 | Lee, Jr. | |
| 4,172,826 | 10/1979 | Haaf et al. | |
| 4,196,116 | 4/1980 | Haaf et al. | 524/409 |
| 4,239,673 | 12/1980 | Lee, Jr. | |
| 4,315,084 | 2/1982 | Cooper et al. | 525/152 |
| 4,322,507 | 3/1982 | Haaf | 525/92 |
| 4,373,045 | 2/1983 | Cooper et al. | 525/152 |
| 4,383,082 | 5/1983 | Lee, Jr. | 525/92 |

Primary Examiner—Morton Foelak
Assistant Examiner—Kriellion Morgan
Attorney, Agent, or Firm—Hedman, Gibson, Costigan & Hoare

[57] ABSTRACT

Flame retardant crosslinking admixtures of an olefinic rubber, a polyphenylene ether resin, an aromatic phosphate, a crosslinking agent, and optionally a stable brominated material are described. Electrically conductive articles, such as wires and cables, in which the compositions are incorporated as insulation material, and methods for their preparation, are also disclosed.

20 Claims, 1 Drawing Sheet

CROSSLINKABLE FLAME RETARDANT COMPOSITIONS OF OLEFINIC RUBBER AND POLYPHENYLENE ETHER

BACKGROUND OF THE INVENTION

The polyphenylene ether resins and methods for their preparation are known, and moreover, described in the patent literature, including U.S. Pat. Nos. 3,306,874 and 3,306,875 (Hay) and U.S. Pat. Nos. 3,257,357 and 3,257,358 (Stamatoff). The polyphenylene ether resins are also known to be combinable with other polymers to form compositions which are extrudable and moldable into products characterized by outstanding properties. Cizek, in U.S. Pat. No. 3,383,435 describes blends of polyphenylene ether resin and polystyrene. Lee, Jr. in U.S. Pat. Nos. 4,166,055 and 4,239,673 discloses blends of polyphenylene ether, polyolefin and styrene-butadiene block copolymer.

Haaf and Cooper, in U.S. Pat. No. 4,172,826, describe flame retardant thermoplastic compositions of a polyphenylene ether resin, a block copolymer and a styrene resin which have been modified by adding an EPDM rubber (that is, a rubbery terpolymer of ethylene, propylene and a diene monomer). As shown in examples of the patent, the EPDM rubber is present in amounts equivalent to or less than the polyphenylene ether resin, and it functions primarily to confer better impact resistance in the polyphenylene ether resin.

The emphasis in many of these patents is on improving the properties of the polyphenylene ether resins and blends by modifying them with other polymers. The polyolefins, and particularly rubbery olefinic polymers, themselves constitute an important family of industrial materials, however. For instance, olefinic rubbers are now employed in formulations for insulation material in electrical wires and cables, and such material is characterized by good elastic properties, but in the typical case lacks good flame resistance in the absence of special additives.

SUMMARY OF THE INVENTION

There have now been discovered new compositions of an olefinic rubber which have been made flame retardant by the inclusion of a multi-component flame retardant agent comprising, in combination, a polyphenylene ether resin, an organic phosphate, and optionally a stable brominated material. The composition also contains a small effective amount of a crosslinking agent and will cure, that is, crosslink, upon heating, or, alternatively, can be crosslinked and thus cured by exposure to high energy radiation, for example, high energy electrons.

The compositions described here are elastomeric in the sense that after crosslinking (curing) they are characterized by tensile elongations of greater than 100%, and more typically greater than 150%.

The invention also concerns, in its other aspects, electrically conductive articles in which the above described composition has been included to provide a layer of insulation, as well as method for producing such articles. An optional feature is to provide an outer layer of a protective material, which can be a thermoplastic or thermosetting polymer, for example, polyvinyl chloride.

DESCRIPTION OF THE INVENTION

In general, the compositions of the invention comprise, in admixture:
(a) a crosslinkable olefinic rubber;
(b) a flame retardant combination of
(i) a polyphenylene ether resin,
(ii) an organic phosphate, and optionally
(iii) a stable brominated material; and
(c) a crosslinking agent.

The olefinic rubber, component (a), which can be present in widely ranging amounts but preferably is included in proportions of 20 parts by weight or more of the polymeric components combined, is derived from ethylene and $C_3$–$C_6$ olefins. In the preferred embodiments, component (a) will be a rubbery copolymer of ethylene and a $C_3$-$C_6$ olefins, for example, ethylenepropylene copolymer, or ethylene-butene copolymer, or a rubbery terpolymer of ethylene, $C_3$–$C_6$ olefin and a diene or polyene (sometimes referred to generally as "EPDM" rubber).

Among the number of suitable rubbery terpolymers useful in the practice of this invention are those comprised of ethylene, propylene and diene, especially unconjugated dienes such as 1,4-pentadiene, 2-methyl-1,4-pentadiene, 1,5-hexadiene, 1,4-hexadiene, and 2-methyl-1,5-hexadiene, as well as terpolymers of ethylene, propylene and endomethylenic diolefins such as dicyclopentadiene, norbornene and methylnorbornene, and additionally, terpolymers of ethylene, propylene and a cyclic diene such as 1,5-cyclooctadiene.

The rubbery olefinic co- and terpolymers are described in the literature, including the ENCYCLOPEDIA OF POLYMER SCIENCE AND TECHNOLOGY, John Wiley and Sons, Inc., Volume 6, pages 359–385 (1967) and the references cited therein.

Preferred for use as the polyphenylene ether resin, component (b) (i) of the flame retardant combination, are homopolymers and copolymers having units of the formula

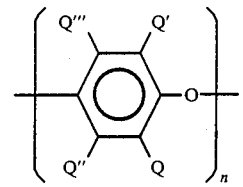

wherein Q, Q', Q" and Q''', are independently selected from the group consisting of hydrogen, halogen, hydrocarbon radicals, halohydrocarbon radicals, hydrocarbonoxy radicals, and halohydrocarbonoxy radicals; and n represents the total number of monomer units and is an integer at least about 20, and preferably at least 50.

In general, the polyphenylene ether resins are self-condensation products of monohydric monocyclic phenols produced by reacting the phenols with oxygen in the presence of complex metal catalysts, with molecular weight being controlled by reaction time, longer times providing a higher average number of repeating units. Particular procedures are known to those skilled in the art and are described in the patent literature, including U.S. Pat. Nos. 3,306,874 and 3,306,875 (to Allan Hay), and U.S. Pat. Nos. 3,257,357 and 3,257,358 (to Gelu Stamatoff).

Illustrative polymers which can be produced by such procedures and which are within the above general formula are: poly(2,6-dilauryl-1,4-phenylene) ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

Also included are polyphenylene ether copolymers, such as copolymers of 2,6-dimethylphenol with other phenols, for example, with 2,3,6-trimethylphenol or 2-methyl-6-butylphenol, etc.

For purposes of the present invention, an especially preferred family of polyphenylene ethers include those having a alkyl substitution in the two positions ortho to the oxygen ether atom, i.e., those of the above formula wherein Q and Q' are alkyl, most preferably having from 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like.

The most preferred polyphenylene ether resin for purposes of the present invention is poly(2,6-dimethyl-1,4-phenylene)ether.

The organic phosphate, component (b) (iii) of the flame retardant combination, is preferably an aromatic phosphate compound of the formula

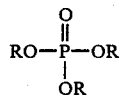

where R is the same or different and is alkyl, cycloalkyk, aryl, alkyl substituted aryl, halogen substituted aryl, aryl substituted alkyl, halogen, or a combination of any of the foregoing, provided at least one R is aryl.

Examples include phenyl bisdodecyl phosphate, phenylbisneopentyl phosphate, phenyl-bis(3,5,5'-trimethylhexyl phosphate), ethyldiphenyl phosphate, 2-ethylhexyldi(p-tolyl)phosphate, bis-(2-ethyhexyl) p-tolylphosphate, tritolyl phosphate, bis-(2-ethylhexyl) phenyl phosphate, tri-(nonylphenyl) phosphate, di (dodecyl)-p-tolyl phosphate, tricresyl phosphate, triphenyl phosphate, dibutylphenyl phosphate, 2-chloroethyldiphenyl phosphate, p-tolyl bis(2,5,5'-trimethylhexyl)phosphate, 2-ethylhexyldiphenyl phosphate, and the like. The preferred phosphates are those in which each R is aryl. Especially preferred is triphenyl phosphate, which may be either unsubstituted or substituted, for example, isopropylated triphenyl phosphate.

Alternatively, the organic phosphate can be a di- or polyfunctional compound or polymer having the formula

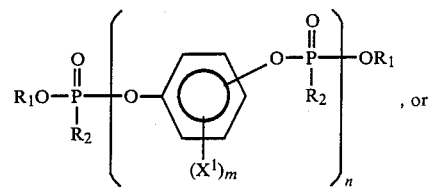, or

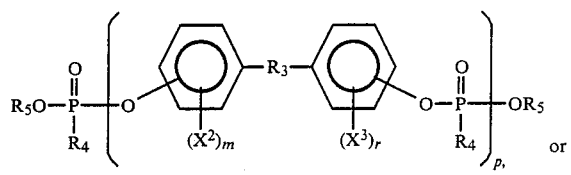 or

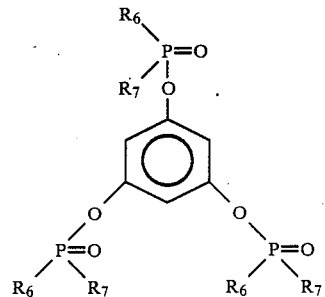

including mixtures thereof, in which $R_1$, $R_3$ and $R_5$ are, independently, hydrocarbon; $R_2$, $R_4$, $R_6$ and $R_7$ are, independently, hydrocarbon or hydrocarbonoxy; $X^1$, $X^2$ and $X^3$ are halogen; m and r are 0 or integers from 1 to 4, and n and p are from 1 to 30.

Examples include the bis diphenyl phosphates of resorcinol, hydroquinone and bisphenol-A, respectively, or their polymeric counterparts.

Methods for the preparation of the aforementioned di- and polyfunctional aromatic phosphates are described in British Patent No. 2,043,083.

Optionally, as explained, the composition can include as a component of the flame retardant combination a stable brominated material, which is a brominated compound, or oligomer, or polymer reasonably stable at elevated temperatures, particularly above 100° C. and, moreover, preferably is relatively nonvolatile at about 100° C.

In the preferred embodiments, component (b) (iii) is a bis phenoxy alkane compound of the formula

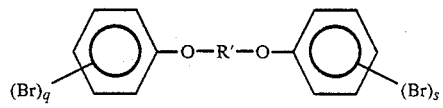

where R' is alkylene, straight or branched, having from 1 to 10 carbon atoms, and more preferably from 1 to about 6 carbon atoms; and q and s represent the total number of bromine atoms on each ring and are independently integers from 1 to 5.

Examples are 1,2-bis(2,4,6-tribromophenoxy) ethane; 1,3-bis(2,4,6-tribromophenoxy)propane; 1,4-bis(2,4,6-tribromophenoxy)butane; and 2,2-bis(4-bromophenoxy)propane. Preferred are 1,2-bis(2,4,6-tribromophenoxy)ethane and 1,2bis(2,3,4,5,6-pentabromophenoxy) ethane. A method of preparation is described in U.S. Pat. No. 4,016,138 (Anderson).

Also, useful as component (b) (iii) are brominated flame retardant polymers and oligomers, including those which are described in U.S. Pat. No. 3,334,154 (Kim) and U.S. Pat. No. 3,833,685 (Wambach). For example, these can be aromatic carbonate copolymers having units of the formula

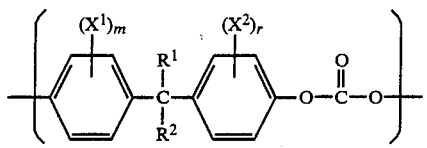

in which $R^1$ and $R^2$ are hydrogen, (lower) alkyl or phenyl, $X^1$ and $X^2$ are bromo or chloro, and m and r are from 1 to 4, and units of the formula:

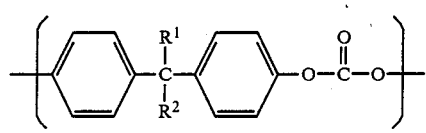

in which $R^1$ and $R^2$ are as defined above.

Especially preferred, however, are oligomeric tetrabromobisphenol-A polycarbonates.

The amount of component (a) is, as indicated, subject to wide variation in the composition, ranging from minor to major proportions depending on particular requirements. Preferably, however, component (a) is present in amounts of 20 parts by weight or more, based on 100 parts of the total polymeric components in the composition.

The flame retardant combination is present in at least the minimum amount necessary to impart a degree of flame retardancy to the composition. The particular amount will vary, depending on the amount of the polyolefin present and possibly other normally flammable ingredients which might also be included in the composition. Each of the three components which make up the flame retardant combination will generally be added in an amount within the following preferred ranges:

| Polyphenylene ether resin, (b)(i) | 5 to 70 parts |
| Organic phosphate, (b)(ii) | 1 to 30 parts |
| Brominated material, (b)(iii) | 0 to 50 parts | based on 100 parts by weight of (a) and (b) (i) together.

The composition is modified to be thermosetting, that is, heat curable or radiation curable by including one or more compounds effective to cause crosslinking of the olefinic rubber when the composition is exposed to an elevated temperature, for example, about 300° F. or higher, or to high energy radiation, for a relatively brief period of time. Preferably, the crosslinking agent, component (c), has a low volatility at the temperatures employed for processing, as well as good stability in the presence of the other ingredients of the composition. Special mention is made of organic peroxides, e.g., dicumyl peroxide; 2,5dimethyl-2,5-di(tert-butylperoxy) hexane; 2,2'-bis(t-butylperoxy)-diisopropyl benzene; ethyl 3,3-bis(t-butylperoxy)butyrate; n-butyl-4,4-bis(4-butylperoxy)valerate; and 2,5-dimethyl-2,5-di(t-butylperoxy)hexane-3. Amounts of from about 1.5 to about 10 parts of the crosslinking agent, for each 100 parts of (a) and (b) (i) combined, are generally sufficient to provide the desired crosslinking.

The composition can be further modified, if desired, by including one or more additives often used with thermoplastic polymers, some of which may serve to beneficially affect the chemical and physical properties. Examples are mineral fillers, glass fibers, flakes or spheres, plasticizers, stabilizers, antioxidants, colorants, processing aids, and so forth.

Particular mention is made of polymeric materials having elastomeric or elastomeric-like properties. They may be, for instance, copolymers and terpolymers of styrene, such as styrene-butadiene copolymers and styrene-butadiene-styrene terpolymers, as well as hydrogenated derivatives of any of the foregoing. Such materials will be added in amounts ranging from 1 to 50 parts by weight, or more, for each 100 parts of (a) and (b) (i) together, and may help to upgrade the compatibility of components (a) and (b) (i).

Optionally, and desirably, a synergist for component (b) (iii), if used, can be added to enhance the flame retardancy effect. This optional component is selected from among compounds known to synergistically improve the flame resistant imparting properties of brominated agents, and generally such compounds are based on antimony and/or molybdenum. Especially favored for use in the present invention is antimony oxide, usually in amounts of from about 1 to 10 parts by weight for each 100 parts of (a) and (b) (i), but other antimony compounds and amounts are possible depending on particular requirements, which will be known to those skilled in the art.

The composition may be processed for use by milling a mixture of the ingredients at an elevated temperature and extruding, molding, sheeting or otherwise working into the desired form.

A particular application involves the use of the composition in the manufacture of insulation material for electrically conductive articles, for example, copper or aluminum wires and cables. A method of use comprises providing the described composition and applying it to the surface of an electrically conductive metal article; thermosetting or radiation curing can take place before application, or in situ on the metal article. The insulated article thus formed can additionally comprise an outer protective coating which can be made of a thermoplastic or thermosetting polymer, e.g., polyvinyl chloride. Exemplary products are shown in the accompanying drawings, which are described below.

DESCRIPTION OF THE SPECIFIC EMBODIMENTS

Figure 1:
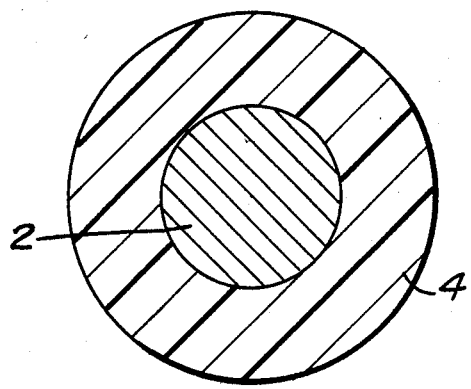
FIG. 1 illustrates an electrically conductive article in accordance with the invention, in cross-section, comprising copper wire 2, and insulation layer 4, consisting of a flame retardant composition as described above.
Figure 2:
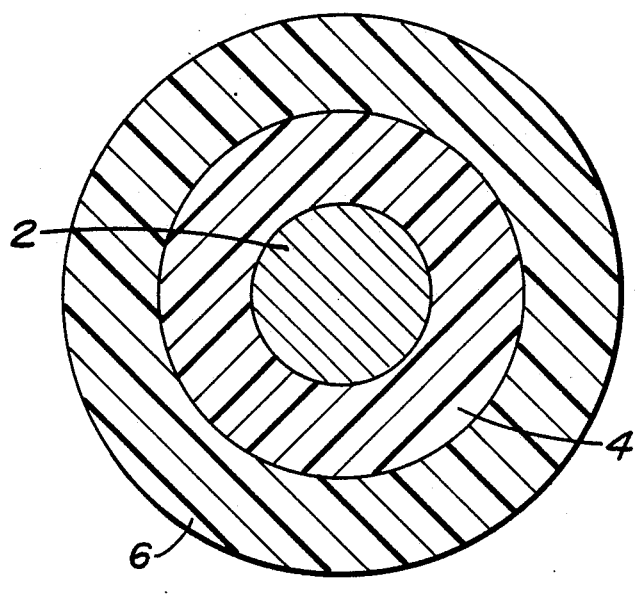
FIG. 2 illustrates a modified embodiment, also in cross-section, comprising copper wire 2, flame retardant insulation layer 4, and outer protective polymeric coating 6.

The invention is illustrated in the following examples, which are intended to show merely some of the embodiments possible. All amounts are stated in parts by weight.

EXAMPLE 1-6

Compositions were prepared by extruding the ingredients noted below and then molding. Molding of 1,2,4 and 5 was accomplished at 360° F. for 10 minutes, and of 3 and 6 at 360° F. for 45 minutes. The properties are shown in the Table.

TABLE 1

| Ingredients | 1 | 2 | 3 | 4 | 5 | 6 |
|---|---|---|---|---|---|---|
| Ethylene-propylene rubber | 50 | 50 | 50 | — | — | — |
| Ethylene-propylene-diene rubber | — | — | — | 50 | 50 | 50 |
| Poly(2,6-dimethyl-1,4-phenylene) ether resin* | 30 | 30 | 30 | 30 | 30 | 30 |
| Elastomeric styrene-ethylene/butylene-styrene block copolymer (SEBS)* | 20 | 20 | 20 | 20 | 20 | 20 |
| Isopropylated triphenyl phosphate | 10 | 10 | 10 | 10 | 10 | 10 |
| Antioxidant | 1 | 1 | 1 | 1 | 1 | 1 |
| 1,2-bis(2,4,6-tribromophenoxy)ethane | — | 4 | 4 | — | 4 | 4 |
| $\alpha,\alpha'$-bis(tert-butylphenoxy)diisopropyl benzene crosslinking agent | — | — | 2 | — | — | 2 |
| Properties | | | | | | |
| Tensile strength, psi | 1040 | 1100 | 1750 | 230 | 245 | 570 |
| Elongation, % | 120 | 125 | 240 | 300 | 250 | 350 |
| Vertical Burn Test: | | | | | | |
| Drip characteristics | ND,ND | ND,ND | ND,ND | ND,ND | ND,ND | ND,ND |
| Seconds to quench: | | | | | | |
| 1st ignition | >30,>30 | 16,14 | 1,2 | >30,>30 | 20,23 | 10,12 |
| 2nd ignition | —,— | >30,>30 | 12,13 | —,— | >30,>30 | >30,>30 |

ND = No drip
*pre-extruded at 500–600° F.

EXAMPLES 7-10

The ingredients listed below were extruded, and the extrudate was molded at 360° F. for 45 minutes to effect cure. The results are shown in the Table.

TABLE 2

| Ingredients | 7 | 8 | 9 | 10 |
|---|---|---|---|---|
| Ethylene-propylene rubber | 20 | 30 | — | — |
| Ethylene-propylene-diene rubber | — | — | 20 | 30 |
| Poly(2,6-dimethyl-1,4-phenylene) ether resin* | 70 | 70 | 70 | 70 |
| Elastomeric styrene-ethylene/butylene-styrene block copolymer (SEBS)* | 30 | 30 | 30 | 30 |
| Isopropylated triphenyl phosphate | 20 | 20 | 20 | 20 |
| Antioxidant | 1 | 1 | 1 | 1 |
| $\alpha,\alpha'$-bis(t-butylperoxy)diisopropyl benzene crosslinking agent | 2 | 2 | 2 | 2 |
| Properties | | | | |
| Horizontal Burn Test ⅛" | ND,ND | ND,ND | ND,ND | ND,ND |
| Horizontal Propagation in inches after 30 sec. | NP,NP | ¼",¼" | ¼",¼" | ¼",¼" |

*pre-extruded at 500–600° F.
ND = No Drip
NP = No Propagation

EXAMPLE 11

The ingredients except crosslinking agent were first milled at 380° to 390° F., then remilled at 320° to 330° F., after which the crosslinking agent was added and the composition was molded at 370° F. for 30 minutes to effect cure. The properties are shown in the Table.

TABLE 3

| Ingredients | |
|---|---|
| Ethylene-propylene-diene rubber | 50 |
| Elastomeric styrene-ethylene/butylene-styrene block copolymer | 10 |
| Poly(2,6-dimethyl-1,4-phenylene)ether resin | 40 |
| Isopropylated triphenyl phosphate | 10 |
| Tetrabromobisphenol-A oligomeric polycarbonate | 30 |
| Bis diphenyl phosphate of resorcinol | 10 |
| Antimony oxide | 5 |
| $\alpha,\alpha'$-bis(t-butylperoxy)-diisopropyl benzene crosslinking agent | 3 |
| Properties | |
| Horizontal propagation in inches, after 30 seconds | ¼ |
| Horizontal Burn Test, ⅛ inch specimen | ND |
| Vertical Burn Test, ⅛ inch specimen | |
| Drip characteristics | ND,ND |
| Seconds to quench | |
| 1st ignition | 0,0 |
| 2nd ignition | 1,0 |

ND = No Drip

All of the above mentioned patents and publications are incorporated herein by reference.

Other modifications and variations of the invention are possible and will occur to those skilled in the art in light of the above disclosure. It is to be understood, therefore, that changes may be made in the particular embodiments shown without departing from the spirit of the invention or its scope as defined in the appended claims.

We claim:

1. A flame retardant curable composition comprising an admixture of
   (a) a crosslinkable olefinic rubber;
   (b) an effective amount of a flame retardant agent comprising, in combination, (i) a polyphenylene ether, (ii) an organic phosphate compound having the formula

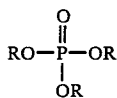

where R is the same or different and is alkyl, cycloalkyl, aryl, alkyl substituted aryl, halogen substituted aryl, aryl substituted alkyl, halogen, or a combination of any of the foregoing, with at least one R being aryl and (iii) a compound having the formula

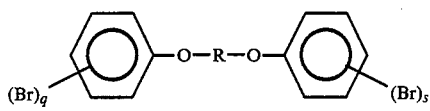

where $R^1$ is alkylene, straight or branched, having from 1 to 10 carbon atoms, and q and s represent the total number of bromine atoms on each ring and are independently integers from 1 to 5; and (c) an effective amount of a crosslinking agent and wherein component (a) is present in an amount of at least 20 parts by weight based upon 100 parts by weight of components (a) and (b) (i) combined.

2. A composition according to claim 1, in which (a) is a rubbery copolymer of ethylene and a $C_3$ to $C_6$ olefin.

3. A composition according to claim 2, in which (a) is an ethylene-propylene rubber.

4. A composition according to claim 1, in which (a) is a rubbery terpolymer of ethylene, a $C_3$ to $C_6$ olefin and a diene.

5. A composition according to claim 4, in which (a) is an ethylene-propylene-diene rubber.

6. A composition according to claim 1, in which (b) (i) is a homopolymer or copolymer having units of the formula $$\left( \begin{array}{c} Q''' \quad Q' \\ \phantom{xxx} \\ Q'' \quad Q \end{array} \right)_n O$$

wherein Q, Q', Q'' and Q''', are independently selected from the group consisting of hydrogen, halogen, hydrocarbon radicals, halohydrocarbon radicals, hydroxycarbonoxy radicals, and halohydrocarbonoxy radicals; and n represents the total number of monomer units and is an integer at least about 20.

7. A composition according to claim 1, in

8. A composition according to claim 1, in which component (b) (ii) is triphenyl phosphate.

9. A composition according to claim 8, in which the triphenyl phosphate is isopropylated.

10. A composition according to claim 1, in which (b) (iii) is 1,2-bis(2,4,6-tribromophenoxy)ethane.

11. A composition according to claim 1, in which (b) (iii) is 1,2-bis(2,3,4,5,6-pentabromophenoxy)ethane.

12. A composition according to claim 1, which also includes an amount of a synergistic agent for (b) (iii) which enhances the flame retardancy effect.

13. A composition according to claim 12, in which the synergistic agent is an antimony compound.

14. A composition according to claim 13, in which the antimony compound is antimony oxide.

15. A composition according to claim 1, in which (c) is an organic peroxide.

16. A composition according to claim 15, in which the organic peroxide is 2,2'-bis(tert-butyl peroxy)-diisopropyl benzene.

17. A composition according to claim 1, which includes an additional polymer, having elastomeric properties.

18. A composition according to claim 17, in which the polymer is a styrene-ethylene/butylenestyrene block copolymer.

19. A composition according to claim 17, in which the polymer is a styrene-butadiene copolymer or a styrene-butadiene-styrene terpolymer.

20. A composition according to claim 19, in which the polymer has been hydrogenated.

* * * * *

UNITED STATES PATENT AND TRADEMARK OFFICE
CERTIFICATE OF CORRECTION

PATENT NO. : 4,910,241

DATED : March 20, 1990

INVENTOR(S) : Visvaldis Abolins, Joseph E. Betts, Fred F. Holub and Gim F. Lee, Jr.

It is certified that error appears in the above-identified patent and that said Letters Patent is hereby corrected as shown below:

Col. 10, claim 7, should read as follows: A composition according to Claim 1, in which (b)(i) is poly(2,6-dimethyl-1,4-phenylene ether).--

Col. 10, claim 18, line 2, "butylenestyrene" should read --butylene-styrene--.

Signed and Sealed this

Twenty-sixth Day of October, 1993

Attest:

BRUCE LEHMAN

Attesting Officer

Commissioner of Patents and Trademarks